(12) United States Patent
Yun et al.

(10) Patent No.: US 12,323,176 B2
(45) Date of Patent: Jun. 3, 2025

(54) MULTIBAND TRANSMITTER EFFICIENTLY IMPLEMENTING PRE-DISTORTION

(71) Applicant: KMW INC., Hwaseong-si (KR)

(72) Inventors: Min Seon Yun, Anyang-si (KR); Joon Hyong Shim, Yongin-si (KR); Young Chan Moon, Suwon-si (KR)

(73) Assignee: KMW INC., Hwaseong-si (KR)

( * ) Notice: Subject to any disclaimer, the term of this patent is extended or adjusted under 35 U.S.C. 154(b) by 335 days.

(21) Appl. No.: 17/895,034

(22) Filed: Aug. 24, 2022

(65) Prior Publication Data

US 2022/0416826 A1    Dec. 29, 2022

Related U.S. Application Data

(63) Continuation of application No. PCT/KR2021/001771, filed on Feb. 10, 2021.

(30) Foreign Application Priority Data

Feb. 25, 2020 (KR) .................... 10-2020-0023103

(51) Int. Cl.
*H04B 1/04* (2006.01)
*H04B 1/62* (2006.01)

(52) U.S. Cl.
CPC ............. *H04B 1/0483* (2013.01); *H04B 1/62* (2013.01); *H04B 2001/0408* (2013.01)

(58) Field of Classification Search
CPC ............. H04B 1/62; H04B 2001/0408; H04B 1/0475; H04B 2001/0425; H04B 1/0057;
(Continued)

(56) References Cited

U.S. PATENT DOCUMENTS 7,183,847 B2 * 2/2007 Suzuki et al. ................ 330/149
8,380,144 B1 * 2/2013 Bai et al. .................. 455/114.3
(Continued)

FOREIGN PATENT DOCUMENTS

CN      101741317 A1    6/2010
CN      103299593 A      9/2013
(Continued)

OTHER PUBLICATIONS

CN 106685868 A) >>> A Several Adjacent Frequency Digital Predistortion System and Method (see title) (Year: 2017).*
(Continued)

*Primary Examiner* — Meless N Zewdu
(74) *Attorney, Agent, or Firm* — Insight Law Group, PLLC; Seung Lee

(57) ABSTRACT

Disclosed is a multi-band transmitter for transmitting a multi-band signal. The multi-band transmitter comprises: a pre-distortion unit including a first digital pre-distorter (DPD) which pre-distorts a first band signal and a second DPD which pre-distorts a second band signal discontinuous from the first band signal; a conversion unit which analog-converts the pre-distorted first band signal and the pre-distorted second band signal; an amplification unit including a first power amplifier (PA), which amplifies the analog-converted first band signal, and a second PA, which amplifies the analog-converted second band signal; and a feedback unit which digital-converts the amplified first band signal to feed the digital-converted first band signal back to the first DPD and digital-converts the amplified second band signal to feed the digital-converted second band signal back to the second DPD. The pre-distortion unit performs pre-distortion by using the fed-back first band signal and the fed-back second band signal.

5 Claims, 4 Drawing Sheets

(58) Field of Classification Search
CPC .... H04B 2001/0433; H04B 1/04; H04B 1/00; H04B 1/06; H04B 1/02; H04B 7/0452; H04B 7/0404; H01Q 5/00; H01Q 5/392; H01Q 5/50; H03F 1/3247; H03F 1/3241; H03F 2201/3221; H03F 2201/3224; H03F 2201/3227; H03F 2201/3231; H03F 2201/3233; H04L 25/49
See application file for complete search history.

(56) References Cited

U.S. PATENT DOCUMENTS

| | | | |
|---|---|---|---|
| 9,306,506 B1 * | 4/2016 | Zhang et al. | H03F 1/3247 |
| 10,797,737 B2 * | 10/2020 | Ota et al. | H04B 1/0475 |
| 11,057,063 B1 * | 7/2021 | He | H04B 1/0475 |
| 2005/0162225 A1 * | 7/2005 | Suzuki et al. | 330/149 |
| 2005/0190857 A1 * | 9/2005 | Braithwaite | 375/296 |
| 2008/0144539 A1 * | 6/2008 | Sperlich et al. | 370/279 |
| 2013/0094612 A1 * | 4/2013 | Kim et al. | H04B 1/62 |
| 2013/0243121 A1 * | 9/2013 | Bai | 375/297 |
| 2014/0009225 A1 * | 1/2014 | Laporte | 330/103 |
| 2015/0163079 A1 | 6/2015 | Rollins | |
| 2015/0236731 A1 * | 8/2015 | Ghannouchi et al. | H04B 1/0475 |
| 2016/0285485 A1 | 9/2016 | Fehri et al. | |
| 2016/0308577 A1 * | 10/2016 | Molina et al. | H04B 1/62 |
| 2017/0047952 A1 | 2/2017 | Kim et al. | |
| 2017/0047954 A1 | 2/2017 | Tian et al. | |
| 2017/0244582 A1 * | 8/2017 | Gal et al. | H04L 25/03885 |
| 2018/0323813 A1 * | 11/2018 | Kim et al. | H04B 1/0475 |
| 2019/0052234 A1 * | 2/2019 | Braun et al. | H03F 1/3247 |
| 2020/0228300 A1 * | 7/2020 | Lee et al. | H04L 5/1461 |

FOREIGN PATENT DOCUMENTS

| | | | |
|---|---|---|---|
| CN | 104901638 A1 | 9/2015 | |
| CN | 106685868 A1 | 5/2017 | |
| CN | 109428610 A | 3/2019 | |
| EP | 2824833 A1 | 1/2015 | |
| KR | 20070089035 A * | 8/2007 | H04L 25/06 |
| KR | 10-1492381 B1 | 2/2015 | |
| WO | 2013/118367 A1 | 8/2013 | |
| WO | WO 2017167354 A1 * | 10/2017 | H03F 1/32 |

OTHER PUBLICATIONS

CN 102130697 A) >>> Receiver, Transmitter and Feedback Device, Transceiver and Signal Processing Method (see title) (Year: 2011).*
Non-final Office Action mailed on Mar. 13, 2024 from the Chinese Patent Office for Chinese Application No. 202180014605.4 and its English translation.
Extended European Search Report mailed on Feb. 2, 2024 from the European Patent Office for European Application No. 21761276.1.
International Search Report mailed Apr. 20, 2021 for International Application No. PCT/KR2021/001771 and its English translation.
Non-final Office Action mailed on Sep. 12, 2023 from the Japanese Patent Office for Japanese Application No. 2022-549634 and its English translation.

* cited by examiner

MULTIBAND TRANSMITTER EFFICIENTLY IMPLEMENTING PRE-DISTORTION

CROSS-REFERENCE TO RELATED APPLICATIONS

This application is a continuation application of International Application No. PCT/KR2021/001771, filed Feb. 10, 2021, which claims priority to Korean Patent Application No. 10-2020-0023103, filed Feb. 25, 2020, in the Korean Intellectual Property Office, the disclosures of which are incorporated herein by reference in their entirety.

TECHNICAL FIELD

The present disclosure relates to a transmitter for transmitting signals of different bands, and particularly, to a multi-band transmitter capable of more accurately and efficiently implementing pre-distortion, digital-to-analog conversion, and amplification of signals of different bands.

BACKGROUND

The content described in this section merely provides background information on the present disclosure and does not constitute the prior art.

A transmitter used in mobile communication systems functions amplifying a signal to be transmitted and transmitting the amplified signal to a service area or region. In recent mobile communication systems, signals of various bands (i.e., a multi-band signal) such as 2G, 3G, 4G, and 5G NR are used, and thus a multi-band transmitter, which is a transmitter capable of processing the multi-band signal, has been developed and commercialized.

FIG. 1 shows an exemplary a multi-band transmitter.

Frequency Allocation (FA)1 and FA2 represent signals (to be transmitted as a multi-band signal) of bands allocated to a mobile communication service provider. The FA1 and the FA2 may be signals of different bands allocated to the same service provider or signals of different bands allocated to different service providers.

First, the FA1 and the FA2 are combined into the multi-band signal through numerically-controlled oscillators (denoted as "NCO1" and "NCO2") and an adder, and then the multi-band signal is input to a digital pre-distorter (DPD).

The multi-band signal input to the DPD is distorted by the DPD, input to a digital-to-analog converter (DAC), and converted into an analog signal by the DAC.

The analog-converted multi-band signal is converted to a radio frequency (RF) by an up-converter (not shown), amplified by a power amplifier (PA), and transmitted through an antenna ANT. An isolator is a component for preventing a reverse signal coming from the antenna from being transmitted to the PA and prevents damage of the PA or inter-modulation.

Since the PA is a non-linear component, it exhibits non-linear characteristics in which a non-linear section occurs in an amplified output as input is increased. In general, this non-linear section is used for output of the transmitter, and when the non-linear section is used for output as it is, the performance of a mobile communication system as well as the transmitter may be degraded.

To solve this problem, a pre-distortion technique is used.

The multi-band signal amplified by the PA is frequency-converted into a baseband signal through a down-converter (not shown) and fed-back to the DPD through an analog-to-digital converter (ADC).

The DPD can compare the "input multi-band signal" with the "feedback multi-band signal", pre-distort the "input multi-band signal" based on the comparison result such that the input multi-band signal becomes opposite to non-linear characteristics of the PA, and output the pre-distorted input multi-band signal to effectively compensate for the nonlinear problem of the PA.

To detect an inter-modulation distortion (IMD) component included in the "feedback multi-band signal", the DPD generally performs signal processing on a bandwidth of 3 to 5 times the bandwidth of the "feed-back multi-band signal".

Accordingly, when different band signals are non-contiguous and a bandwidth between the different band signals increases (i.e., the multi-band signal is a wideband signal), there may be a problem in that the DPD cannot acceptably process the signals. In addition, the problem of not being able to acceptably process the wideband signal may occur not only in the DPD but also in the PA, the isolator, and the like.

For example, as shown in FIG. 2, different band signals FA1 and FA2 to be processed by one DPD may be non-contiguous and the bandwidth between FA1 and FA2 may be 400 MHz. In this case, the DPD or the like needs to perform signal processing on a bandwidth of at least three times (e.g., 1.2 GHz). However, signal processing for such a wide bandwidth (i.e., wideband) may exceed the capability of the currently commercialized DPD or the like.

BRIEF SUMMARY

Technical Problem

An object of an embodiment of the present disclosure is to provide a transmitter capable of acceptably processing a non-contiguous wideband signal by processing a multi-band signal through different paths for the different bands of the multi-band signal.

Technical Solution

Various aspects of the present disclosure are directed to providing a multi-band transmitter for transmitting a multi-band signal. The multi-band transmitter comprises a pre-distortion unit including a first digital pre-distorter (DPD) for pre-distorting a first band signal and a second DPD for pre-distorting a second-band signal non-contiguous to the first band signal. The multi-band transmitter further comprises a conversion unit for converting the pre-distorted first band signal and the pre-distorted second band signal into analog signals, and an amplification unit including a first power amplifier (PA) for amplifying the analog-converted first band signal and a second PA for amplifying the analog-converted second band signal. The multi-band transmitter further comprises a feedback unit for converting the amplified first band signal into a digital signal and feeding the digital signal back to the first DPD and converting the amplified second band signal into a digital signal and feeding the digital signal to the second DPD. The pre-distortion unit performs pre-distortion using the fed-back first band signal and the fed-back second band signal.

Advantageous Effects

As described above, the present disclosure can process a wideband multi-band signal accurately and efficiently. In addition, the present disclosure can provide a transmission function more suited to diversification of a mobile communication system by accurately and efficiently processing the wideband multi-band signal. Furthermore, the present disclosure can reduce the number of internal components of the transmitter, thereby reducing the size of the transmitter and improving the ease or efficiency of manufacturing.

DESCRIPTION OF EMBODIMENTS

Figure 1:
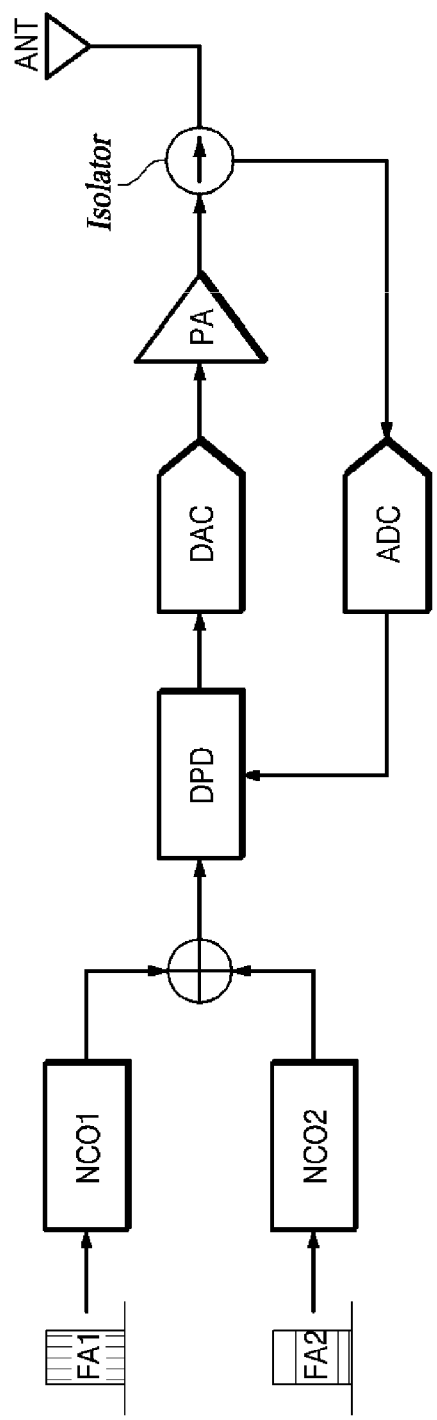
FIG. 1 is a block diagram showing an example of a conventional multi-band transmitter.
Figure 2:
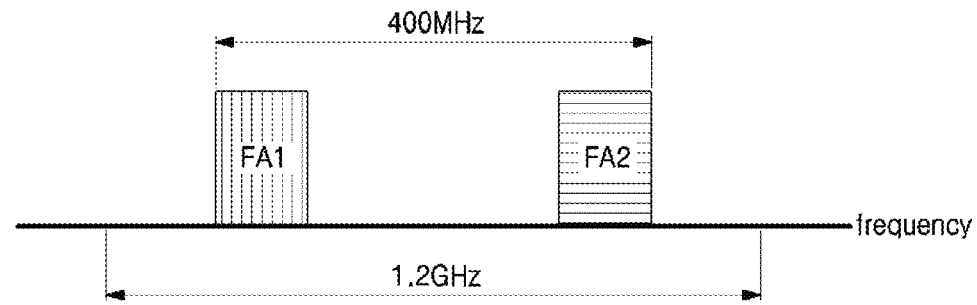
FIG. 2 is a diagram illustrating a wideband multi-band signal.

Hereinafter, various exemplary embodiments of the present disclosure will be described in detail with reference to the accompanying drawings. The same reference numerals are used throughout the drawings to designate the same or similar components. Furthermore, when it is determined that the detailed description of the known art may obscure the gist of the present disclosure, the detailed description will be omitted.

It will be understood that, although the terms "first", "second", etc. may be used herein to describe various elements, these elements should not be limited by these terms. These terms are only used to distinguish one element from another element. It will be further understood that the terms "comprise", "include", "have", etc. when used in the exemplary embodiment, specify the presence of stated features, integers, steps, operations, elements, components, and/or combinations thereof but do not preclude the presence or addition of one or more other features, integers, steps, operations, elements, components, and/or combinations thereof. Furthermore, the terms "unit'", "module", etc. described in the exemplary embodiment means a unit that processes at least one function or operation, which may be implemented as hardware or software or a combination of hardware and software.

The present disclosure discloses a multi-band transmitter, which is a device capable of accurately and efficiently processing a wideband signal.

Figure 3:
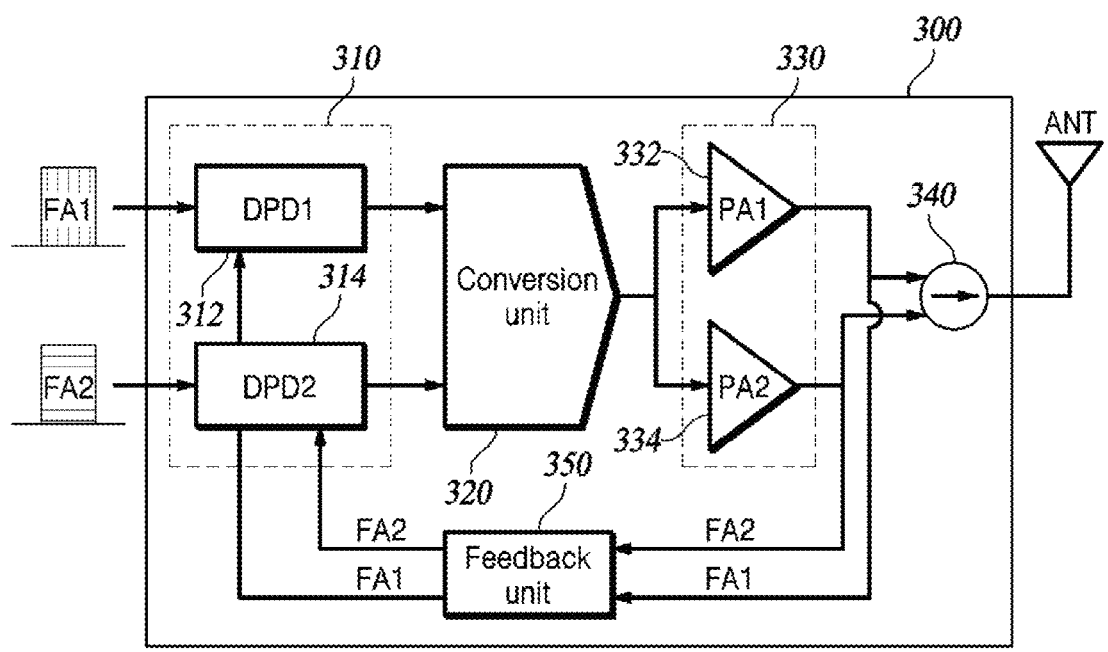
FIG. 3 is an exemplary block diagram of a transmitter capable of implementing techniques of the present disclosure.

FIG. 3 is an exemplary block diagram of a multi-band transmitter capable of implementing techniques of the present disclosure. As shown in FIG. 3, the multi-band transmitter 300 may include a pre-distortion unit 310, a conversion unit 320, an amplifier 330, and a feedback unit 350. In addition, the multi-band transmitter 300 may further include an isolator 340 or further include a frequency converter (up-converter and down-converter (not shown)) in addition thereto.

Different band signals may be input to the pre-distortion unit 310. The different band signals may be two or more band signals. In the present specification, it is assumed that the different band signals processed through the transmitter 300 includes a first band signal FA1 and a second band signal FA2, and FA1 and FA2 may be non-contiguous wideband signals.

The pre-distortion unit 310 corresponds to a component for pre-distorting the different band signals of the multi-band signal.

The pre-distortion unit 310 may include a first DPD (denoted as "DPD1" 312) and a second DPD (denoted as "DPD2" 314). DPD1 312 may pre-distort FA1 and DPD2 314 may pre-distort FA2. DPD1 312 and DPD2 314 may pre-distort FA1 and FA2 based on signals fed-back from the feedback unit 350.

As described above, the pre-distortion unit 310 may include the component DPD1 for pre-distorting FA1 and the component DPD2 for pre-distorting FA2 as separate components. That is, the pre-distortion unit 310 may process the different band signals of the multi-band signal through different paths (or different components). Accordingly, FA1 and FA2 may be pre-distorted through different components.

Figure 4:
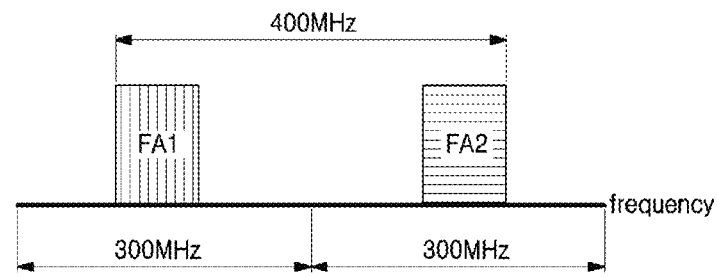
FIG. 4 is a diagram for describing a wideband multi-band signal processed by a multi-band transmitter of the present disclosure.

For example, as shown in FIG. 4, when the bandwidth between FA1 and FA2 is 400 MHz (wideband), the band for FA1 (300 MHz on the left) and the band for FA2 (300 MHz on the right) may be separately pre-distorted. Each band corresponds to a bandwidth (300 MHz) that can be processed by one DPD. Accordingly, the present disclosure can solve the problem of the prior art in that a wideband multi-band signal cannot be acceptably processed.

The pre-distorted band signals are input to the converter 320. The conversion unit 320 may convert the pre-distorted FA1 into an analog signal and convert the pre-distorted FA2 into an analog signal.

Specific embodiments of the conversion unit 320 will be described later.

The analog-converted FA1 and the analog-converted FA2 are input to the amplifier 330. In this process, the frequencies of analog-converted FA1 and analog-converted FA2 may be up-converted to RFs through a frequency converter (not shown).

The amplifier 330 corresponds to a component for amplifying the power of the different band signals.

The amplifies 330 may include a first PA (denoted as "PA1" 332) and a second PA (denoted as "PA2" 334). PA1 332 may amplify analog-converted (and frequency up-converted) FA1, and PA2 334 may amplify analog-converted (and frequency up-converted) FA2.

In this manner, the amplifier 330 may include the component PA1 for amplifying FA1 and the component PA2 for amplifying FA2 as separate components. That is, the amplifier 330 may process the different band signals through different paths (or different components). Accordingly, FA1 and FA2 can be amplified through different components. Therefore, the present disclosure can process the wideband multi-band signal more accurately and efficiently.

The amplified band signals are input to the isolator 340. The isolator 340 corresponds to a component for transmitting the amplified band signals only in the direction of an antenna ANT. That is, the isolator 340 may prevent a reverse signal from being input to the multi-band transmitter 300. The isolator 340 may be implemented using a circulator.

The amplified band signals are input to the feedback unit 350. In this stage, the frequencies of the amplified multi-band signals may be down-converted to a baseband through a frequency converter (not shown).

The feedback unit 350 may convert the amplified (and frequency down-converted) FA1 into a digital signal and convert the amplified (and frequency down-converted) FA2 into a digital signal. Further, the feedback unit 350 may feed back the digital-converted FA1 to DPD1 312 and feed back the digital-converted FA2 to DPD2 314. The pre-distortion unit 310 may pre-distort the input FA1 and FA2 based on the fed-back FA1 and FA2.

Embodiment 1

Embodiment 1 uses a method of respectively processing different band signals through different paths by at least one of the conversion unit 320 and the feedback unit 350. Embodiment 1 can be divided into embodiment (1-1) for a specific design of the conversion unit 320 and embodiment (1-2) for a specific design of the feedback unit 350.

Embodiment 1-1: Conversion Unit 320

Figure 5:
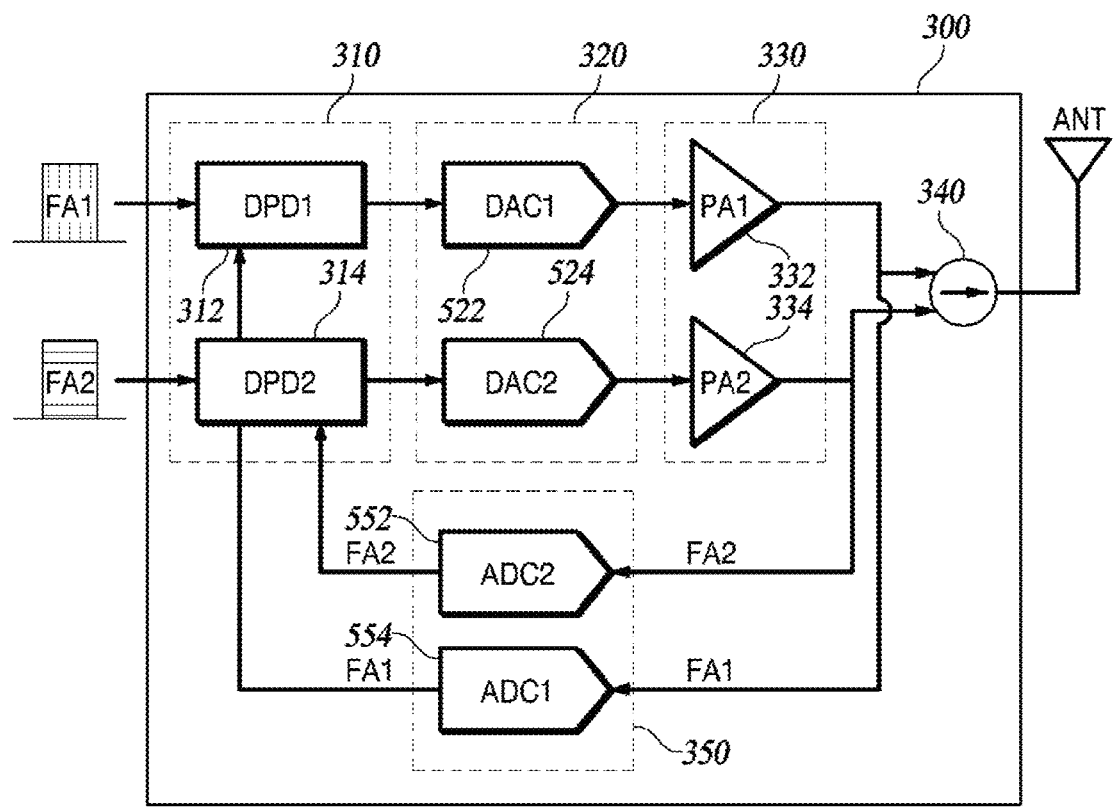
FIG. 5 is a block diagram illustrating another example of a transmitter capable of implementing the techniques of the present disclosure.

FIG. 5 is a block diagram illustrating another example of a transmitter capable of implementing the techniques of the present disclosure. As shown in FIG. 5, the conversion unit 320 may include first DAC (denoted as "DAC1" 522) and a second DAC (denoted as "DAC2" 524).

DPD1 312 may transmit the pre-distorted FA1 to DAC1 522, and DPD2 314 may transmit the pre-distorted FA2 to DAC2 524.

DAC1 522 may convert FA1 pre-distorted in DPD1 312 into an analog signal, and DAC2 524 may convert FA2 pre-distorted in DPD2 314 into an analog signal. That is, FA1 and FA2 may be converted to analog signals through different paths.

In this manner, the conversion unit 320 may include the component DAC1 for converting FA1 and the component DAC2 for converting FA2 as separate components. That is, the conversion unit 320 may process the different band signals of the multi-band signal through different paths (or different components). Accordingly, FA1 and FA2 may be converted through different components. Therefore, the present disclosure can process a wideband multi-band signal more accurately and efficiently.

DAC1 522 may transmit the analog-converted FA1 to PA1 332, and DAC2 524 may transmit the analog-converted FA2 to PA2 334.

Embodiment 1-2: Feedback Unit 350

As shown in FIG. 5, the feedback unit 350 may include a first ADC (denoted as "ADC1" 554) and a second ADC (denoted as "ADC2" 552).

FA1 amplified by PA1 332 may be input to ADC1 554, and FA2 amplified by PA2 334 may be input to ADC2 552. In this stage, the frequency of amplified FA1 may be down-converted to a baseband and the frequency of amplified FA2 may also be down-converted to a baseband through a frequency converter (not shown).

ADC1 554 may convert the amplified (and frequency down-converted) FA1 into a digital signal, and ADC2 552 may convert the amplified (and frequency down-converted) FA2 into a digital signal. Further, ADC1 554 may feed back the digital-converted FA1 to DPD1 312, and ADC2 552 may feed back the digital-converted FA2 to DPD2 314.

In this manner, the feedback unit 350 may include the component (ADC1) for converting and feeding back FA1 and the component (ADC2) for converting and feeding back FA2 as separate components. That is, the feedback unit 350 may process the different band signals of the multi-band signal through different paths (or different components). Accordingly, FA1 and FA2 can be converted and fed-back through different components. Therefore, the present disclosure can process a wideband multi-band signal more accurately and efficiently.

Embodiment 2

Embodiment 2 uses a method of reducing the number of internal components of the conversion unit 320 and the feedback unit 350.

The use of a high-performance DAC and ADC (or a wideband DAC and a wideband ADC) suitable for processing the wideband multi-band signal may be contemplated. In view of this, the present disclosure proposes the multi-band transmitter 300 that includes the conversion unit 320 for converting the wideband multi-band signal into an analog signal through a single path and the feedback unit 350 for converting the wideband multi-band signal into a digital signal through a single path. When the wideband multi-band signal is processed through a single path, the size of the multi-band transmitter 300 can be reduced and ease or efficiency of manufacturing can be improved.

Embodiment 2 can be divided into embodiment (2-1) for a specific design of the conversion unit 320 and embodiment (2-2) for a specific design of the feedback unit 350.

Embodiment 2-1: Conversion Unit 320

Figure 6:
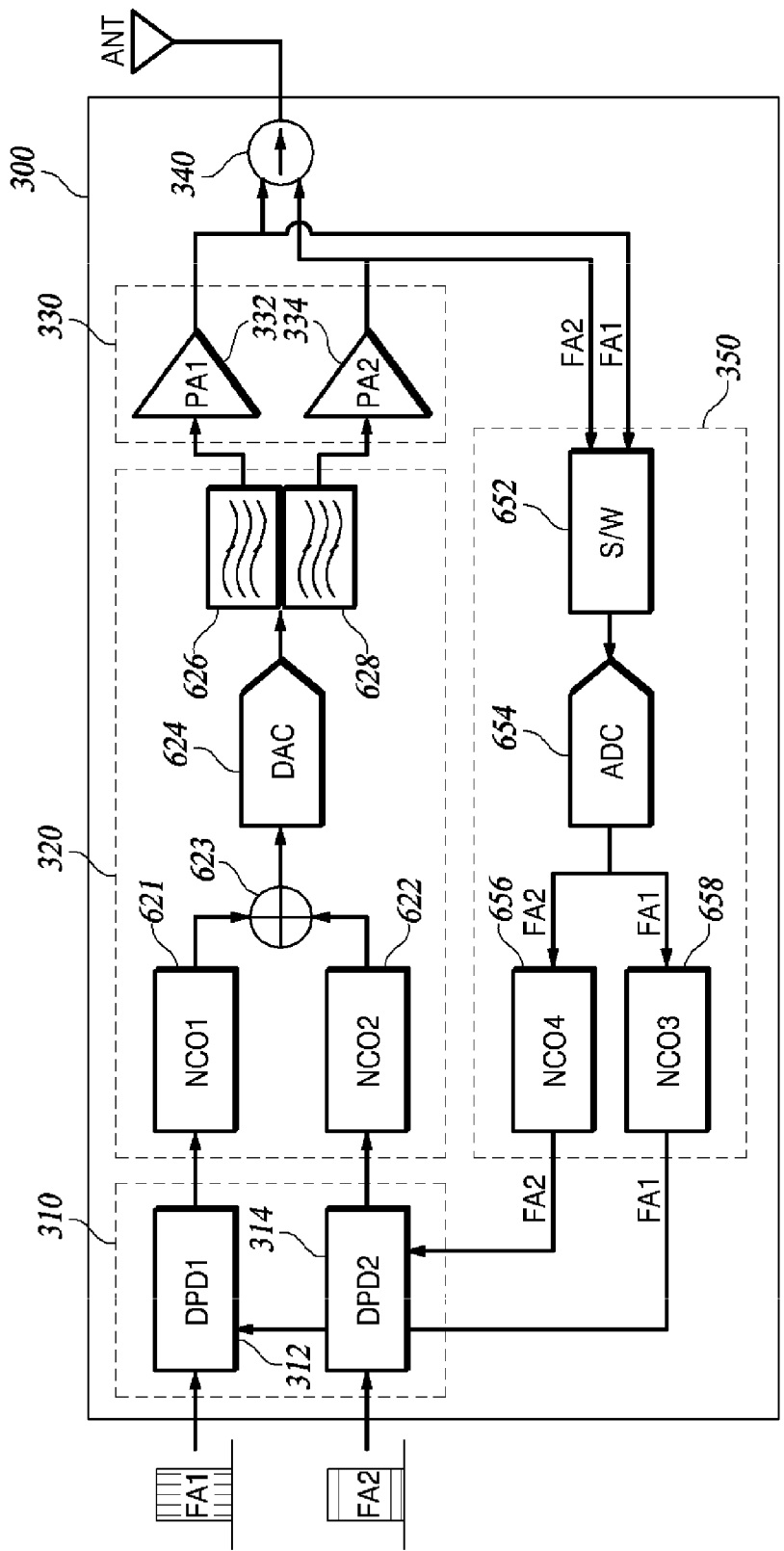
FIG. 6 is a block diagram illustrating another example of a transmitter capable of implementing the techniques of the present disclosure.

FIG. 6 is a block diagram illustrating another example of a transmitter capable of implementing the techniques of the present disclosure. As shown in FIG. 6, the conversion unit 320 may include a mixer (including components 621, 622 and 623), a DAC 624, and a filter unit (including components 626 and 628).

The mixer may combine or synthesize FA1 pre-distorted by DPD1 312 and FA2 pre-distorted by DPD2 314 to output a combined signal. That is, the mixer may perform a function of combining FA1 and FA2 to form a single path for analog conversion.

The mixer may include a first up-converter (denoted as "NCO1" 621), a second up-converter (denoted as "NCO2" 622), and an adder 623. NCO1 621 may up-convert the frequency of the pre-distorted FA1, and NCO2 622 may up-convert the frequency of the pre-distorted FA2. The adder 623 may add the up-converted FA1 to the up-converted FA2 to output a combined signal.

The DAC 624 may convert the combined signal output from the adder 623 into an analog signal. That is, the conversion unit 320 can convert the multi-band signal (including FA1 and FA2) using one wideband DAC 624 capable of processing the wideband multi-band signal.

The filter unit may filter the analog-converted signals FA1 and FA2 from the analog-converted combined signal. The filter unit may include a first filter 626 and a second filter 628. The first filter 626 may filter or separate the analog-converted signal FA1 from the analog-converted combined signal, and the second filter 626 may filter or separate the analog-converted signal FA2 from the analog-converted combined signal.

The filtered signal FA1 may be input to PA1 332 and amplified thereby, and the filtered signal FA2 may be input to PA2 334 and amplified thereby.

Embodiment 2-2: Feedback Unit 350

As shown in FIG. 6, the feedback unit 350 may include a digital conversion unit (including 652 and 654), a third down-converter (denoted as "NCO3" 658), and a fourth down-converter (denoted as "NCO4" 656).

The digital conversion unit may convert FA1 amplified by PA1 332 into a digital signal for a first period of time and convert FA2 amplified by PA2 334 into a digital signal for a second period of time. That is, the digital conversion unit may convert any one of the amplified FA1 and the amplified FA2 into a digital signal at any instant of time. Accordingly, the digital conversion unit can perform a function of forming a single path for digital conversion of a multi-band signal.

The digital conversion unit may include a switch (S/W) 652 and an ADC 654. The switch 652 may select one of the amplified FA1 and the amplified FA2. The ADC 654 may convert the signal (i.e., either amplified FA1 or amplified FA2) selected by the switch 652 into a digital signal.

NCO3 658 may down-convert the frequency of the converted digital signal FA1 and feed the same back to DPD1 312. NCO4 656 may down-convert the frequency of the converted digital signal FA2 and feed the same back to DPD2 314.

Although embodiments have been described for illustrative purposes, those having ordinary skill in the art should appreciate that and various modifications and changes are possible, without departing from the idea and scope of the embodiments. Embodiments have been described for the sake of brevity and clarity. Accordingly, one of ordinary skill should understand that the scope of the embodiments is not limited by the embodiments explicitly described above but is inclusive of the claims and equivalents thereto.

What is claimed is:

1. A multi-band transmitter for transmitting a multi-band signal, comprising:
    a pre-distortion unit including a first digital pre-distorter (DPD) for pre-distorting a first band signal and a second DPD for pre-distorting a second-band signal non-contiguous to the first band signal;
    a conversion unit for converting the pre-distorted first band signal and the pre-distorted second band signal into analog signals;
    an amplification unit including a first power amplifier (PA) for amplifying the analog-converted first band signal and a second PA for amplifying the analog-converted second band signal; and
    a feedback unit for converting the amplified first band signal into a digital signal and feeding the digital signal back to the first DPD and converting the amplified second band signal into a digital signal and feeding the digital signal to the second DPD,
    wherein the pre-distortion unit performs pre-distortion using the fed-back first band signal and the fed-back second band signal, and
    wherein the conversion unit includes:
    a mixer for combining the pre-distorted first band signal and the pre-distorted second band signal and outputting a combined signal;
    a digital-to-analog converter (DAC) for converting the combined signal into an analog signal; and
    a filter unit for filtering the analog-converted first band signal and the analog-converted second band signal from the analog-converted combined signal.

2. The multi-band transmitter of claim 1, wherein the mixer includes:
    a first up-converter for up-converting a frequency of the pre-distorted first band signal;
    a second up-converter for up-converting a frequency of the pre-distorted second band signal; and
    an adder for combining the up-converted first band signal and the up-converted second band signal to output the combined signal.

3. The multi-band transmitter of claim 1, wherein the feedback unit includes:
    a first analog-to-digital converter (ADC) for converting the amplified first band signal into a digital signal and feeding the digital signal back to the first DPD; and
    a second ADC for converting the amplified second band signal into a digital signal and feeding the digital signal back to the second DPD.

4. The multi-band transmitter of claim 1, wherein the feedback unit includes:
    a digital conversion unit for converting the amplified first band signal into a digital signal or converting the amplified second band signal into a digital signal;
    a third down-converter for down-converting a frequency of the converted digital first band signal and feeding back the down-converted digital first band signal to the first DPD; and
    a fourth down-converter for down-converting a frequency of the converted digital second band signal and feeding back the down-converted digital second band signal to the second DPD.

5. The multi-band transmitter of claim 4, wherein the digital conversion unit includes:
    a switch for selecting one of the amplified first band signal and the amplified second band signal; and
    an ADC for converting the signal selected by the switch into a digital signal.

* * * * *